(12) United States Patent
Chen et al.

(10) Patent No.: US 10,958,673 B1
(45) Date of Patent: Mar. 23, 2021

(54) MULTI-FACTOR AUTHENTICATION AUGMENTED WORKFLOW

(71) Applicant: Sift Science, Inc., San Francisco, CA (US)

(72) Inventors: Irving Chen, San Francisco, CA (US); Shahar Ronen, San Francisco, CA (US); Mark Lunney, San Francisco, CA (US); Chloe Chi, San Francisco, CA (US)

(73) Assignee: Sift Science, Inc., San Francisco, CA (US)

(*) Notice: Subject to any disclaimer, the term of this patent is extended or adjusted under 35 U.S.C. 154(b) by 0 days.

(21) Appl. No.: 17/120,864

(22) Filed: Dec. 14, 2020

Related U.S. Application Data

(60) Provisional application No. 62/947,159, filed on Dec. 12, 2019, provisional application No. 62/972,771, filed on Feb. 11, 2019, provisional application No. 63/018,458, filed on Apr. 30, 2020.

(51) Int. Cl.
 *H04L 29/06* (2006.01)

(52) U.S. Cl.
 CPC ...... *H04L 63/1416* (2013.01); *H04L 63/1466* (2013.01); *H04L 63/30* (2013.01)

(58) Field of Classification Search
 None
 See application file for complete search history.

(56) References Cited

U.S. PATENT DOCUMENTS

| | | | |
|---|---|---|---|
| 10,296,912 | B2 | 5/2019 | Sadaghiani et al. |
| 2017/0265076 | A1 | 9/2017 | Richards et al. |
| 2018/0191763 | A1 | 7/2018 | Hillard et al. |
| 2019/0108334 | A1* | 4/2019 | Sadaghiani ............ G06N 5/045 |
| 2019/0260780 | A1 | 8/2019 | Dunn et al. |
| 2019/0378049 | A1 | 12/2019 | Widmann et al. |
| 2019/0385170 | A1 | 12/2019 | Arrabothu et al. |
| 2020/0285737 | A1 | 9/2020 | Kraus et al. |

* cited by examiner

*Primary Examiner* — Brandon S Hoffman
(74) *Attorney, Agent, or Firm* — Alce PLLC

(57) ABSTRACT

A system and method for a machine learning-based score driven automated verification of a target event includes: receiving a threat verification request; extracting a corpus of threat features; predicting the machine learning-based threat score; evaluating the machine learning-based threat score against distinct stages of an automated disposal decisioning workflow; computing the activity disposal decision, wherein the activity disposal decision informs an action to allow or to disallow the target online activity; receiving the machine learning-based threat score as input into an automated verification workflow; computing whether an automated verification of the target online activity is required or not based on an evaluation of the machine learning-based threat score against distinct verification decisioning criteria of the automated verification workflow; automatically executing the automated verification of the target online activity and exposing results of the automated verification to the subscriber for allowing or for disallowing the target online activity.

15 Claims, 3 Drawing Sheets

100

```
Configuring Verification Parameters S205
```

Receiving a Request for Risk Assessment and Verification S210

Computing a Risk Assessment S220

Implementing an Automated Verification Workflow S230

Implementing a Verification S240
- Generating a Verification Challenge S241
- Identifying Verification Message Template S242
- Transmitting the Verification Communication S243
- Evaluating Verification Response S244

Implementing Verification Limits/Controls S245

Collection Verification Disposals S250

FIGURE 2

MULTI-FACTOR AUTHENTICATION AUGMENTED WORKFLOW

CROSS-REFERENCE TO RELATED APPLICATIONS

This application claims the benefit of U.S. patent application Ser. No. 17/013,036, filed 4 Sep. 2020, which claims the benefit of U.S. Provisional Application No. 62/947,159, filed 12 Dec. 2019, U.S. Provisional Application No. 62/972,771, filed 11 Feb. 2020, and U.S. Provisional Application No. 63/018,458, filed 30 Apr. 2020, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a method for implementing a machine learning-informed automated verification of online activity includes: receiving, via an application programming interface (API) of a threat mitigation service, a multi-part request from a subscriber of the threat mitigation service, the multi-part request comprising (a) a first request for computing a machine learning-based threat score for a target online activity, (b) a second request for computing an activity disposal decision based on the machine learning-based threat score; executing the first request including: using one or more feature extraction systems to extract a corpus of threat features based on an input of activity data relating to the target online activity; using one or more threat scoring machine learning models to predict the machine learning-based threat score based on an input of the corpus of threat features; executing the second request including: evaluating the machine learning-based threat score against one or more distinct stages of an automated disposal decisioning workflow; computing the activity disposal decision based on the evaluation, wherein the activity disposal decision informs an action to allow or to disallow the target online activity; executing an automated verification workflow based on the execution of the second request including: receiving the machine learning-based threat score as input into an automated verification workflow; computing whether an automated verification of the target online activity is required or not based on an evaluation of the machine learning-based threat score against one or more distinct verification decisioning criteria of the automated verification workflow; if the automated verification satisfies one of the one or more distinct verification decisioning criteria, automatically executing the automated verification of the target online activity and exposing results of the automated verification to the subscriber for allowing or for disallowing the target online activity.

In one embodiment, the one or more distinct verification decisioning criteria comprise one or more verification thresholds, each of the one or more verification thresholds comprising a distinct minimum machine learning threat score value that, when satisfied, automatically causes an execution of a verification route.

In one embodiment, each of the one or more verification thresholds is tethered to one of a plurality of distinct verification routes, if the machine learning-based threat score satisfies a distinct one of the one or more verification thresholds, automatically executing a distinct one of the plurality of distinct verification routes that is tethered to the distinct one of the one or more verification thresholds that was satisfied.

In one embodiment, the automated verification workflow comprises a multi-stage synchronous process flow that includes: (i) a first stage that evaluates the machine learning threat score for the target activity against the one or more verification thresholds; (ii) a second stage that identifies verification route based on the evaluation; (iii) a third stage that identifies verification parameters including communication channel and communication address; (iv) a fourth stage that identifies verification messaging template of the subscriber; (v) a fifth stage that constructs a verification message based on verification data and the verification messaging template; (vI) a sixth stage that communicates the verification messaging to a target user associated with the target online activity; and (vii) a seventh state that identifies a result of the verification messaging.

In one embodiment, the method includes implementing a threat scoring API that uses the one or more threat scoring machine learning models to predict the machine learning-based threat score, wherein the threat scoring API asynchronously provides the machine learning-based threat score directly to each of the automated disposal decisioning workflow and the automated verification workflow.

In one embodiment, the activity disposal decision of the automated decisioning workflow is subject to the results of the automated verification; if the results of the automated verification comprises an unsuccessful verification of the target online activity, the activity disposal decision of the automated decisioning workflow is rendered unavailable to the subscriber.

In one embodiment, the activity disposal decision of the automated decisioning workflow is subject to the results of the automated verification; if the activity disposal decision informs the action to allow the target online activity and the results of the automated verification comprises an unsuccessful verification of the target online activity, altering the activity disposal decision to inform the action to disallow the target online activity.

In one embodiment, the automated verification workflow comprises a binary automated verification workflow having only one verification threshold for identifying whether the automated verification of the target online activity is required or not for the target online activity.

In one embodiment, automatically executing the automated verification of the target online activity includes: generating a verification challenge value by the threat mitigation service; storing the verification challenge value with a unique identifier for the multi-part request; selecting a verification message template based on an account identifier for the subscriber; composing a verification communication message based on an integration of the verification challenge value with the verification message template; and transmitting the verification communication message via a selected communication channel to a user.

In one embodiment, the method includes implementing response verification including: receiving, via the API of the threat mitigation service, a request for verification check, the request for verification comprising the unique identifier for the multi-part request; identifying the verification challenge value based on the unique identifier; and transmitting the verification challenge value to the subscriber for validating or not a response to the verification communication message.

In one embodiment, the method includes implementing a verification limit that limits a number of verification challenges that can be generated by the threat mitigation service during a period for the automated verification of the target online activity.

In one embodiment, implementing the verification limit includes: implementing a virtual token bucket that tracks via a counter a count of the number of verification challenges created during the period for the automated verification of the target online activity; imposing a timeout that sets a restricted period in which no additional verification challenges can be generated for the automated verification of the target online activity.

In one embodiment, the method includes implementing a verification limit that limits a predetermined rate of response within a period to the automated verification of the target online activity.

In one embodiment, implementing the verification limit includes: setting a maximum rate of response to the automated verification; and if a rate of response to the automated verification exceeds the maximum rate of response, causing additional response to the automated verification beyond the verification limit to fail.

In one embodiment, a method for implementing a machine learning-based score driven automated verification of a target event includes: receiving, via an application programming interface (API) of a threat mitigation service, a threat verification request; using one or more feature extractors to extract a corpus of threat features based on an input of activity data relating to the target online activity; using one or more threat scoring machine learning models to predict the machine learning-based threat score based on an input of the corpus of threat features based on the threat verification request; evaluating the machine learning-based threat score against one or more distinct stages of an automated disposal decisioning workflow; computing the activity disposal decision based on the evaluation, wherein the activity disposal decision informs an action to allow or to disallow the target online activity; receiving the machine learning-based threat score as input into an automated verification workflow; computing whether an automated verification of the target online activity is required or not based on an evaluation of the machine learning-based threat score against one or more distinct verification decisioning criteria of the automated verification workflow based on the threat verification request; if the automated verification satisfies one of the one or more distinct verification decisioning criteria, automatically executing the automated verification of the target online activity and exposing results of the automated verification to the subscriber for allowing or for disallowing the target online activity.

In one embodiment, the one or more distinct verification decisioning criteria comprise one or more verification thresholds, each of the one or more verification thresholds comprising a distinct minimum machine learning threat score value that, when satisfied, automatically causes an execution of a verification route.

In one embodiment, each of the one or more verification thresholds is tethered to one of a plurality of distinct verification routes, if the machine learning-based threat score satisfies a distinct one of the one or more verification thresholds, automatically executing a distinct one of the plurality of distinct verification routes that is tethered to the distinct one of the one or more verification thresholds that was satisfied.

In one embodiment, a system for implementing a machine learning-based score driven automated verification of a target event includes a threat scoring application programming interface (API) of a threat mitigation service that: receives a threat verification request; uses one or more machine learning models to extract a corpus of threat features based on an input of activity data relating to the target online activity; uses one or more threat scoring machine learning models to predict the machine learning-based threat score based on an input of the corpus of threat features based on the threat verification request; an automated decisioning workflow module implementing by one or more computers of the threat mitigation service that: evaluates the machine learning-based threat score against one or more distinct stages of an automated disposal decisioning workflow; computes the activity disposal decision based on the evaluation, wherein the activity disposal decision informs an action to allow or to disallow the target online activity; an automated verification workflow module by the one or more computers of the threat mitigation service that: receives the machine learning-based threat score as input into an automated verification workflow; computes whether an automated verification of the target online activity is required or not based on an evaluation of the machine learning-based threat score against one or more distinct verification decisioning criteria of the automated verification workflow based on the threat verification request; if the automated verification satisfies one of the one or more distinct verification decisioning criteria, automatically executes the automated verification of the target online activity and exposing results of the automated verification to the subscriber for allowing or for disallowing the target online activity.

In one embodiment, the one or more distinct verification decisioning criteria comprise one or more verification thresholds, each of the one or more verification thresholds comprising a distinct minimum machine learning threat score value that, when satisfied, automatically causes an execution of a verification route.

In one embodiment, each of the one or more verification thresholds is tethered to one of a plurality of distinct verification routes, if the machine learning-based threat score satisfies a distinct one of the one or more verification thresholds, the automated verification workflow module automatically executes a distinct one of the plurality of distinct verification routes that is tethered to the distinct one of the one or more verification thresholds that was satisfied.

BRIEF DESCRIPTION OF THE FIGURES

FIG. 2 illustrates an example method in accordance with one or more embodiments of the present application.

DESCRIPTION OF THE PREFERRED EMBODIMENTS

Figure 1:
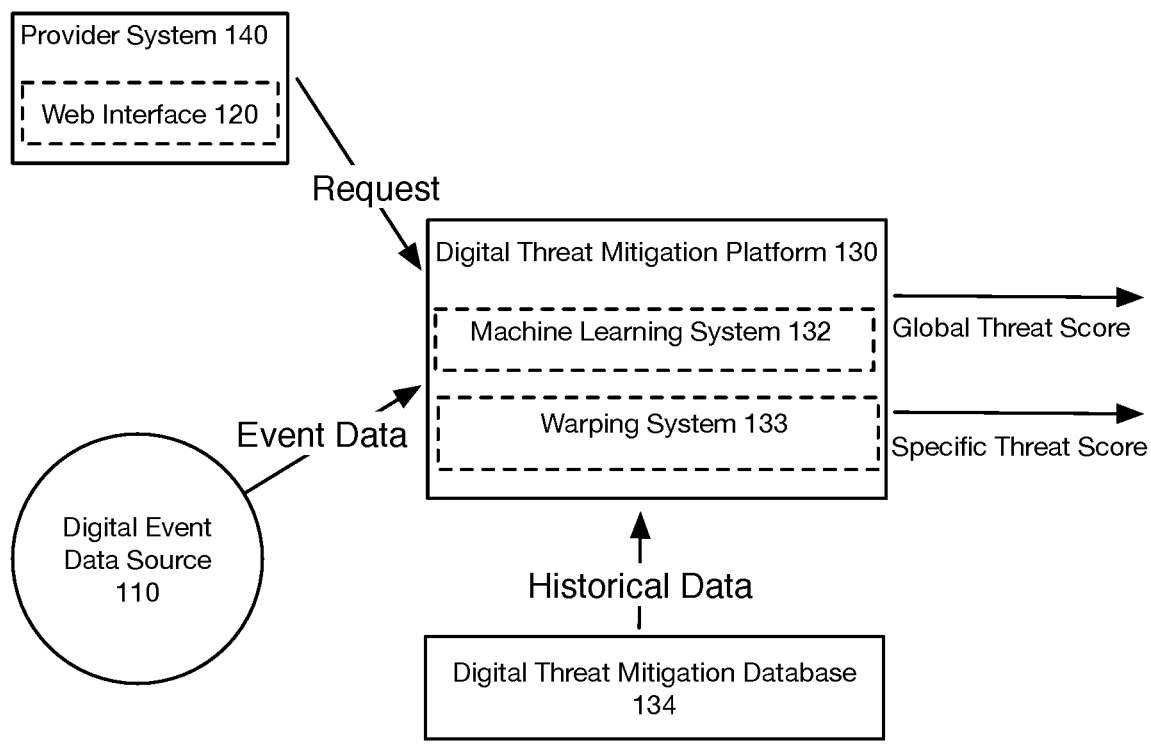
FIG. 1 illustrates a schematic representation of a system in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

1. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources 110 function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources 110 may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources no and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating endpoint health intelligence and/or other data relevant to the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communicate with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Figure 3:
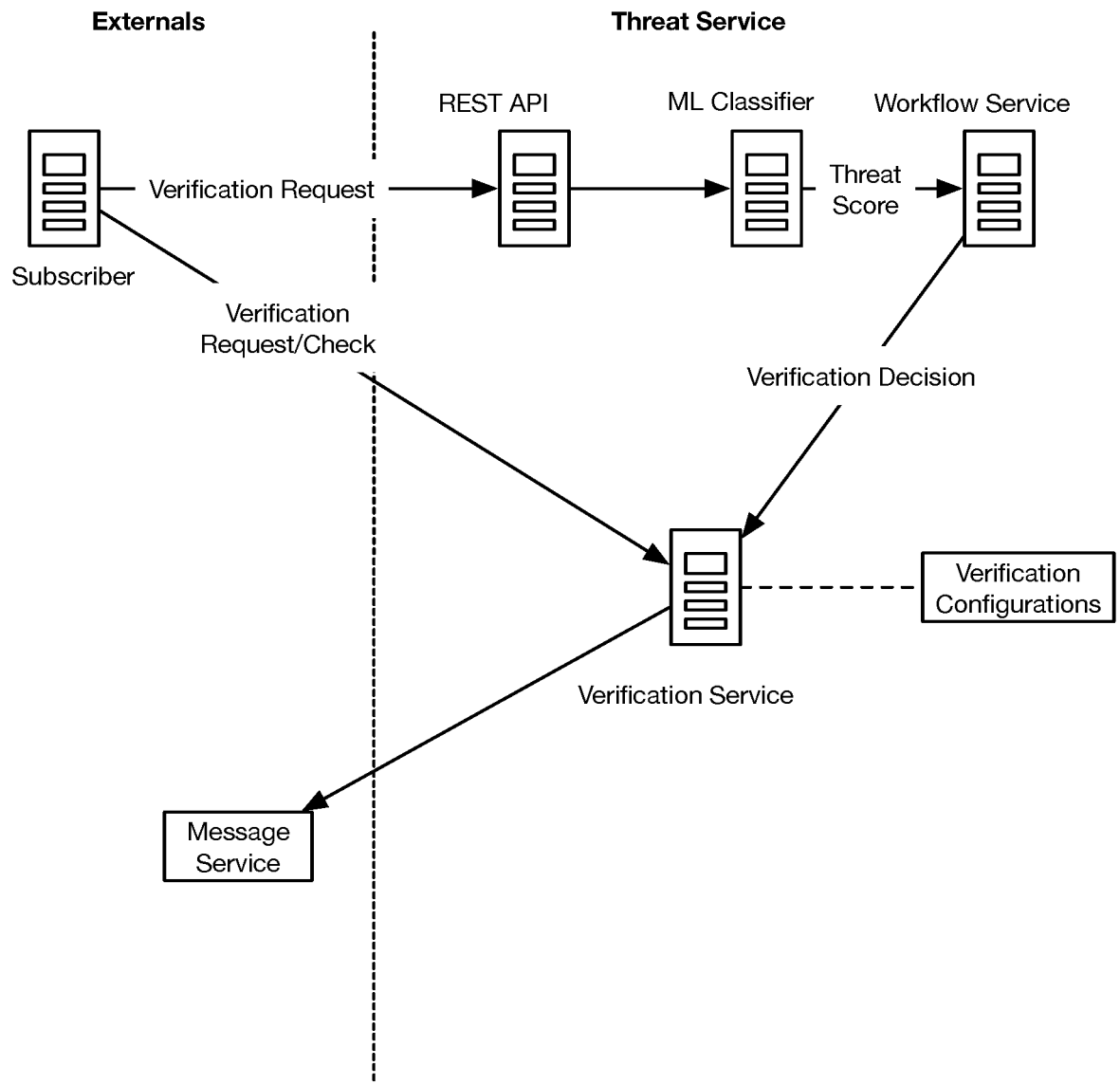
FIG. 3 illustrates an example schematic of a subscriber interfacing with threat evaluation services and verification services of a digital threat mitigation platform in accordance with one or more embodiments of the present application.

Additionally, as shown in FIG. 1-FIG. 3, the systems and methods described herein may implement the digital threat mitigation platform/service in accordance with the one or more embodiments described in the present application as well as in the one or more embodiments described in U.S. patent application Ser. No. 15/653,373, which is incorporated by reference in its entirety.

2. Method for Risk Assessment and Activity Verification

As shown in FIG. 2, the method 200 includes receiving a request for an event risk assessment and automated verification S210, evaluating a risk or a threat of a subject event associated with a verification request S220, implementing an automated verification workflow S230, and implementing a verification of a target user S240. The method 200 optionally includes configuring one or more verification parameters S205 and collecting verification disposals and updating one or more subscriber-specific machine learning threat scoring models S250.

2.05 Configuring Verification Parameters

Optionally, S205, which includes configuring one or more verification parameters of a multi-factor verification service, may function to enable a subscriber of the threat service to provide and/or configure one or more parameters for generating a verification challenge communication to target users of the subscriber.

In one or more embodiments, S205 may include configuring or defining one or more communication parameters, message template content and parameters, parameters of one or more automated verification workflows, and/or the like.

In some embodiments, setting or defining the one or more communication parameters may include defining one or more possible channels of communication. In such embodiments, S205 may require a designation of at least one communication channel, such as email communication channel, and may allow for a configuration of any suitable number of communication channels including, but not limited, to email, text messaging, chat messaging, and/or the like.

In some embodiments, configuring or defining the one or more message template parameters may include defining standard message content for each distinct type of event or distinct type of transaction that may trigger or cause a verification event or request. Additionally, or alternatively, S205 may enable a subscriber to stylize each distinct message communication template according to a brand, location, language, subscriber-segments from which the subscriber desires to be associated with a corresponding distinct message communication template.

In some embodiments, configuring or defining parameters for one or more automated verification workflows may include identifying one or more threat score thresholds for evaluating a computed threat score for a given event and identifying one or more corresponding rules or triggered verification actions that should be automatically executed by the threat service if a corresponding threat score threshold is satisfied. For instance, a subscriber may designate a first threat score threshold that, if satisfied, should automatically trigger a verification challenge communication and may designate a second threat score threshold within an automated verification workflow that does not trigger a verification challenge communication to a target user.

In one or more embodiments, S205 may enable a subscriber to configure or set verification parameters for initial verification requests relating to a first time request for verifying a target user, verification parameters for resend verification requests relating to a second or subsequent request for verifying a target user, and parameters for verification check relating to a request for determining whether a user's response to a verification communication challenge was successful or not successful.

Preferably, S205 may function to provide a web-accessible interface that is in operable or configurable communication with one or more services and/or systems of the threat service.

2.1 API Request for Verification

S210, which includes receiving a request for an event risk assessment and automated verification, may function to include receiving a verification request from a subscriber via an API of the threat service. Preferably, the request for verification relates to an API call made from a back-end computing system of a subscriber, via the API (e.g., a RESTful application programming interface) of the threat service requesting that the threat service perform one or more of a risk or threat evaluation of a subject event involving one or more online services associated with the subscriber and perform a verification of a target user associated with the subject event.

In one or more embodiments, the request for an event risk assessment and automated verification comprises a multi-part request that includes (a) a first request for computing a machine learning-based threat score for a target online activity, (b) a second request for computing an activity disposal decision based on the machine learning-based threat score, and (c) a third request for executing a verification action based on the machine learning-based threat score. In one or more embodiments, each part of the multi-part request may be executing synchronously or asynchronously (in parallel or the like). Additionally, in some embodiments, the third request for executing the verification action may be an embedded request that may be optionally executed if one or more criteria may be satisfied when executing the second request. That is, in some embodiments, the multi-part request may only include the first request and the second request. In such embodiment, a workflow for computing the activity disposal decision may include a criteria for triggering or causing an execution or request for an automated verification. Accordingly, if the criteria is satisfied by a machine learning threat score or the like, the third request may be initiated or caused by the workflow for computing the activity disposal decision. Therefore, the workflow for computing the activity disposal decision may include an embedded third request for executing the verification action.

A digital event and/or a subject event, as referred to herein, preferably relates to one or more of an event or user action occurring in an online environment that may involve a risk of fraud or abuse. In one or embodiments, the subject event may include a malicious actor/user or an attacker that may be attempting to wrongfully appropriate an account (e.g., account takeover) of a user and/or an attempt to perform one or more online transactions (e.g., a purchase, a content post, etc.) that may adversely compromise or otherwise, perpetrate a fraud/abuse against the subscriber and/or lawful user of the subscriber.

In some embodiments, S210 may function to receive multiple, distinct types of requests for verification via the API including, but not limited to, an original request to implement or send a verification, a request to reimplement or resend a verification, a request for a verification check confirming a response to a historical or completed verification challenge, and the like.

In one or more embodiments, a verification request may include verification request data that includes one or more pieces of data that may function as input by the threat service for handling the request for verification. In a preferred embodiment, the verification request may include, at least, a user identifier for a target user of the verification, a verification type indicating a communication medium or channel (e.g., email, text messaging (e.g., SMS), push notification through an application, app-based authentication, and/or any suitable communication channel) through which a verification message may be transmitted to the target user, and a verification messaging address or account (e.g., an email address, phone account or phone number, chat account, Slack account, etc.). Additionally, or alternatively, the verification request may include and/or may be accompanied by event data relating to a subject event requiring additional verification.

Accordingly, in a first implementation, a verification request may be directed through a request handling pipeline of the threat service that may function to handle automated workflow-enabled verification requests. That is, in this first implementation, verification requests that may be received via the API of the threat service may be directed through a request handling pipeline that initiates and/or automatically triggers an automated verification workflow (e.g., a workflow service) that includes a series of preconfigured steps, thresholds, or stages for identifying whether a verification request should be issued to a target user, assessing a risk associated with a subject event of the verification request and that may function to produce an outcome that dictates one of a plurality of distinct manners in which the verification request should be handled by the threat service. For instance, the automated verification workflow may evaluate whether a verification challenge should be generated by a distinct verification service of the threat service and communicated to a user based on a computed risk (i.e., threat score) of the subject event compared against one or more risk identification criteria.

In a second implementation, S210 may function to receive a verification request directly at a verification service of the threat mitigation service. In such embodiments, the verification request from the subscriber may be made directly to the verification service or verification API of the threat service rather than via a Rest API or events API, which may function to trigger one or more workflows including, but not limited to workflows that generate threat scores and automate a decisioning on whether a verification challenge should be made to a user or not. Thus, a direct verification request may function to bypass one or more automated workflows for handling a verification request.

2.2 Threat Score Generation|Account Takeover Score (ATO) Generation

S220, which includes evaluating a risk or a threat of a subject event associated with a verification request, may function to assess event data associated with the subject event of the verification request and compute a risk assessment, as described in U.S. Pat. No. 10,181,032, which is incorporated herein in its entirety by this reference. That is, in one or more embodiments, S220 may function to assess attributes of the subject event associated with a verification request and compute a risk assessment or a threat score indicating a level of risk or threat of fraud and/or abuse that may be involved in the subject event.

In one or more embodiments, S220 may function to pass event data associated with the verification request through a feature extractor that may function to identify and extract risk features from event data associated with the verification request. In a preferred embodiment, the risk feature extractor may include a trained machine learning model or an ensemble of trained machine learning models that have been specifically trained to identify or extract fraud or abuse risk features of online events, transaction, actions, and/or actors. For instance, the feature extractor may function to identify and extract a historical time series of features or attributes. In such instance, session features or attributes may include internet protocol (IP) addresses of a device involved in the session, user agent data (e.g., a web browser, etc.) used to access the digital account and/or implement the session, cookies (e.g., an HTTP cookie, web cookie, browser cookie, etc.), and the like.

Additionally, S220 may function to implement the risk feature extractor to identify and extract a number of logins (or login attempts) made with respect to an online account. Specifically, the risk feature extractor may function to identify the login or attempted login by the user and whether the login or attempted login was successful or a failure. Accordingly, S220 may use the risk feature extractor to associate, link, or append as metadata a success or failure indication with each identified login or attempted login made with respect to the online account.

S220 may additionally or alternatively provide risk features from event data into an ensemble of or one or more machine learning models that may be specifically trained to classify and/or predict whether an event or activity involves a threat of online fraud or abuse. Accordingly, in response to receiving a corpus of risk features extracted from a given event associated with a request for verification, S220 may function to generate a threat score. A threat score may range between any two values or range of characters (e.g., 0-100, A-Z, and the like, any range of non-numerical indicators or characters (e.g., Green to Yellow to Red, low to intermediate to high, etc.), and the like. Accordingly, a machine learning model-computed threat score may be represented in any suitable manner.

Additionally, or alternatively, S220 may function to provide a corpus of extracted risk features to threat-specific machine learning models that may specifically predict or classify a distinct type of fraud or abuse if one exists or becomes apparent. That is, in one or more embodiments, S220 may function to produce with the threat-specific machine learning models fraud or abuse specific classification labels or values, which specifically identifies a type of fraud or abuse (e.g., payment abuse, coupon abuse, account takeover, etc.).

2.3 Automated Verification Workflow|Verification Decision Computation

S230, which includes implementing an automated verification workflow, may function to implement a subscriber-specific workflow or processes that outputs a verification execution decision. That is, in one or more embodiments, S230 may function to initialize or instantiate an automated verification workflow based on a request for verification that uses at least a machine learning-based threat score (e.g., Account Takeover Score (ATO) score, or the like) as input into the automated verification workflow for determining whether a verification challenge should be communicated to the target (online) user (e.g., a messaging/verification account associated with user ID).

In one or more embodiments, an automated verification workflow for a given subscriber may include a plurality of distinct verification thresholds with each verification threshold being associated with a distinct verification action. In such embodiments, S230 may function to evaluate a computed threat score against one or more of the plurality of distinct verification criteria (e.g., distinct thresholds and the like) and if or when a distinct verification threshold may be satisfied, S230 may function to automatically execute a verification execution decision. A verification execution decision or a verification route may include one or more rules or specific processes for executing a verification of a target user or not verifying a target user and/or for executing a verification of a target online activity or not. Additionally, or alternatively, a verification execution decision may include a distinct manner of a plurality of available verification techniques in which a verification of a target user or a target activity may be performed.

In one implementation, each of the plurality of distinct verification criteria or thresholds may escalate, such that higher threat score values correspond to or trigger a verification execution decision with a verification process with relative higher difficulty. That is, in one or more embodiments, distinct score thresholds of an automated verification workflow or the like may be mapped to distinct verification execution decisions or verification routes that may increase the verification requirements on a target user or for a target activity as the distinct thresholds increase in value or the like. In some embodiments, each of a plurality of distinct verification criteria or thresholds may include a minimum threat score value or the like. In such embodiments, the plurality of distinct verification criteria may be considered as lying along a continuum or spectrum of threat score values and as a minimum threat score for a distinct criteria may be satisfied along the spectrum or continuum, associated verification requirements may be increased, such that enhanced or additional verification for a given target user or target activity may be required if or when a computed threat score satisfies (i.e., meets or exceeds a minimum threat score). In one example, a first verification criteria may include a minimum threat score of 60, assuming a threat score scale of 0-100, and a second verification criteria may include a minimum threat score of 70. In this example the first verification criteria if satisfied by a computed threat score for a given target activity or user (e.g., computed threat score=73) may trigger or cause an automated execution of a first verification through a first verification channel, such as email or the like, and the second verification criteria if satisfied may trigger or automatically cause an automated execution of a second distinct verification through a second verification channel, such as via a mobile phone. In such example, a verification (e.g., a verification text message, etc.) through the mobile phone of a user may be considered a more stringent or enhanced form of verification relative to a verification message communicated through an email address or the like. It shall be noted that, while a minimum threat score may be designated or set as a criterion for evaluating a machine learning-based threat for identifying an automated verification route, the workflow criteria may include upper bounds, lower bounds, exact matches, maximums, and the like as criterion within the workflow.

In another implementation, the automated verification workflow may include a threat score evaluation section or part that is binary (i.e., a binary automated verification workflow) and includes only one threat score threshold, such that a computed threat score for a given event when evaluated against the threat score threshold either satisfies or does not satisfy the threshold. In such implementation, depending on whether the computed threat score satisfies or does not satisfy the threat score threshold, S230 may function to provide instructions or output a verification execution decision that includes one of automatically executing a verification of a target user and not executing a verification of a target user.

Additionally, or alternatively, in some embodiments, the automated verification workflow may include a multi-stage synchronous process flow that includes (i) a first stage that evaluates the machine learning threat score for the target activity against the one or more verification thresholds; (ii) a second stage that identifies verification route based on the evaluation; (iii) a third stage that identifies verification parameters including communication channel and communication address (iv) a fourth stage that identifies verification messaging template of the subscriber; (v) a fifth stage that constructs a verification message based on verification data and the verification messaging template; (vi) a sixth stage that communicates the verification messaging to a target user associated with the target online activity; and (vii) a seventh stage that identifies a result of the verification messaging. In such embodiments, one or more stages of the automated verification workflow may be performed in parallel or simultaneously while one or more other parts may be performed synchronously because of dependencies between sequential stages within the multi-stage synchronous process flow. For instance, an execution of the second stage may be dependent on a completion of the first stage since the second stage may require an output of the first stage. In another example, an execution of the second stage and the third stage may be performed in parallel since an execution of the third stage may not depend on an output or outcome of the execution of the second stage. It shall be noted that while the plurality of stages of the multi-stage synchronous process flow may be enumerated sequentially, in some embodiments, variations including more or less stages may be added without departing significantly from an overall intent of the multi-stage synchronous process, which includes at least performing and automated verification of a target user and/or a target online activity.

Additionally, or alternatively, S230 may function to output one or more recommendations as a result of an evaluation of a threat score for a given event including one or more of block action (i.e., disallow), accept action (i.e., allow), watch action (e.g., monitor), review action, and/or the like.

2.4 Multi-Factor Authentication|Verification Service

S240, which includes implementing a verification, may function to execute a verification of a target user, subject event, target activity, and/or user action. In a preferred embodiment, a verification may be automatically initiated or triggered based on an evaluation of a machine learning-based threat score that is computed by the threat service using details of a subject event (see S230). In such preferred embodiment, the machine learning-based threat score may be the subject of an automated verification workflow that compares the threat score to one or more distinct verification thresholds, that if satisfied, directs the threat service to a distinct verification action or verification decision (i.e., a machine learning-based threat score driven verification), as described above and as shown by way of example in FIG. 3. S240 may function to execute or not execute the verification according to the verification decision or outcome of the automated verification workflow. Additionally, or alternatively, a verification may be initiated based on a direct request for a verification from a subscriber to a verification service or API of the threat service.

In one or more embodiments, the verification may include a verification challenge defining or forming a second or subsequent authentication factor of a multi-factor authentication of a user of the subscriber or a user attempting to establish an account with the subscriber. In a preferred embodiment, the verification, as implemented by the threat service or the like, comprises a second factor of a two-factor authentication (2FA). For instance, a user attempting one or more actions (e.g., login attempt or the like) may function to provide login credentials for accessing an account with the subscriber. In such an example, the login credentials may be a first factor of authentication and a verification by the threat service may be a second factor of authentication. It shall be noted that in a preferred embodiment, the second factor of authentication or verification performed by the threat service may preferably be performed if or when there is a suspicion or indicated of an elevated risk of threat in the target activity or with respect to a target user performing the target activity. In other words, the method 200 may preferably be performed selectively based on details or circumstances of a target activity or event and not necessarily performed naively without any consideration or calculation of a potential risk surrounding the target activity or the target user.

In one or more embodiments, a verification forming part of a multi-factor authentication may function to verify a login attempt by verifying an ownership of an account (e.g., email account, phone account, etc.) of a user performing the login action with one or more online services (e.g., a web-accessible interface) of a subscriber. It shall be recognized that the verification may be implemented to verify any suitable action or actor associated with a subject event including, but not limited to, high-value (e.g., value exceeding a high-value threshold) actions/events, non-typical actions/events, and/or the like.

In one or more embodiments, the verification preferably includes a verification challenge. In such embodiments, the verification challenge preferably relates to a threat service-generated verification value or a verification prompt that an authentic user may interact with or respond to (or not respond to) for verifying or not one or more of an identity of a user performing a subject action, an ownership of a target account, a validity of an online event/transaction, and/or the like.

2.41 Verification Challenge Generation

Accordingly, S240 which includes S241 may function to generate a verification challenge. In some embodiments, the structure or composition of the verification challenge may be based on a computed verification decision (e.g., the outcome of an automated verification flow). That is, in such embodiments, a complexity of a verification challenge to a user may be increased according to a level or severity of a verification decision. For example, if a computed threat score for a subject event of a verification is high (i.e., exceeds a high risk threshold), S230 may function to compute a verification decision indicating that a complex or stringent verification may be required. Accordingly, when executing the verification, S241 may function to select a complex or a stringent verification challenge from a continuum or a plurality of available verifications having stepped or increasing levels of difficulty.

In a preferred embodiment, S241 may function to generate a verification challenge value (i.e., a valid response value to a verification challenge) that includes a one-time password (OTP) or a dynamic password, which may only be valid for only one login session or transaction. In some embodiments, a length or a complexity of an OTP may be based on verification parameters provided by the subscriber that may indicate a preferred length or a preferred minimum length of an OTP. For instance, a subscriber's verification parameters may indicate that an OTP with a minimum of six characters is required for a valid verification challenge value.

Additionally, or alternatively, S241 may function to generate a verification challenge prompt that includes a challenge question or statement. For example, S240 may function to generate a challenge prompt that outlines details of a pending transaction or login with a prompt, such as "Is this your transaction? Select or respond 'Yes' or 'No'". In a variant of this implementation, S241 may function to generate the verification challenge prompt based on verification parameters provided by a subscriber. In this variant, the verification parameters may include one or more possible verification challenge prompts that may be intelligently selected by the threat service. It shall be noted that the verification challenge may be generated in any suitable form or with any suitable indicia including, but not limited to, a requirement for a biometric input, an input of a verification image or document (e.g., driver's license), selecting a magic link via email, captcha, a security key, and/or the like.

Additionally, S241 may function to store by the threat service the verification challenge value(s) in electronic association with the verification request. Preferably, the verification challenge value, such as an one-time password or the like, may be encrypted in such a way that if an attacker is able to compromise the database, the attacker would still be unable to reverse-engineer the verification challenge value.

2.42 Verification Message Selection and Construction

S240 includes S242, which includes identifying a verification message template. In one or more embodiments, the threat service may function to store and/or have access to one or more distinct verification message templates for each distinct subscriber to the service. In such embodiments, S242 may function to identify the one or more verification message templates for a given subscriber based on a subscriber identifier and select one verification message template of the one or more verification message templates based on a verification type. Additionally, or alternatively, S242 may include identifying and setting one or more verification message parameters including, but not limiting to, selecting a content (e.g., a wording) for the verification message, a country, and/or language in which the verification message should be generated.

In some embodiments, the one or more verification message templates may include distinct subscriber-configured message templates based on a type of the subject event. For instance, a given subscriber may have a distinct verification message template for a login-based event and another verification message template for a non-typical/suspicious transaction or the like.

Additionally, or alternatively, S242 may function to select a given verification message template from one or more available verification message templates based on a verification type or an intended channel to be used for sending the verification communication. For example, a given subscriber may have preconfigured multiple verification message templates with a subset being designed or configured for transmission through SMS (i.e., text messaging) and another subset of the multiple templates being available for verification messages being sent through email. Accordingly, based on an indicated communication channel or designated user contact address/information, S242 may function to intelligently select an appropriate verification message template that most suitably corresponds to the indicated communication channel.

Additionally, or alternatively, S242 may function to select a given verification message template based on a brand or brand name associated with a target activity. In one or more embodiments, a subscriber to the threat service may carry or be associated with a plurality of distinct brand names (e.g., Gap, Banana Republic, Old Navy, etc.). In such embodiments, the subscriber may include a specific brand name within the verification request data or verification request to the threat service. Accordingly, in a selection of the given verification message template, S242 may function to select the template that matches the identified brand name in the verification request data or the like. In one or more embodiments, the method 200 or the like may function to enable a subscriber to the threat service to generate or design one or more verification message templates that account for one or more verification circumstances and/or for one or more brands associated with the subscriber.

2.43 Verification Communication

S240 includes S243, which includes constructing the verification communication message and transmitting the verification communication message. In one or more embodiments, S243 may function to integrate and/or embed a generated verification challenge value with a selected verification message template.

In one embodiment, S243 may function to produce the verification communication message to a local queue or local message storage that may function to asynchronously initiate or trigger an API call to a message delivery service or message communication platform (e.g., an email communication platform, SMS communication platform, etc.). In such embodiments, the message delivery service may function to automatically deliver the verification communication message to a target user via a designated communication channel. In one or more embodiments, the designated communication channel may be selected based on a verification route or outcome of the automated verification threshold. That is, depending on a value of a machine learning-based threat score for a target activity and/or target user, S243 may function to select a given communication channel that increases in security in the channel and reduces in a vulnerability or susceptibility to attack and/or discovery by an attacking party. Thus, as the verification route increases in verification requirements, S243 may correspondingly increase a selection of a communication channel with increased security attributes or properties.

Contemporaneous with a communication of the verification communication message to a target user, S243 may additionally or alternatively function to generate a verification event that includes a record of a valid, pending verification communication message to a target user.

2.44 Verification Response

S240 includes S244, which includes implementing response verification, may function to receive a request for a verification check via the API of the threat service or the like for identifying whether a valid or invalid response to the verification challenge was made by the target user. In some embodiments, similar to the request for verification, the request for verification check may have a required format and required verification data, such as target user and/or target event identification data, that enables the threat service to identify and/or locate a status and data associated with a given verification event.

In one implementation, a response to the verification challenge communication may be provided to a subscriber to the threat service. That is, while the verification communication challenge may be transmitted from the threat service to a target user, a response by the target user to the verification challenge communication may be transmitted to the subscriber. That is, while the verification communication challenge may be transmitted to a target user by a second party (i.e., the threat service), a response to the verification communication challenge may be submitted, from a user receiving the challenge, to a first party (i.e., a subscriber) that initiated the verification request. In this implementation, a request for verification check by the subscriber may include response data including a response to the verification challenge communication. In response to or upon receipt of the request for verification check, S244 may function to locate an account or verification event and compare the response data of the request for verification check against the verification challenge stored with the threat service in the account or as described in the verification event. In one variant of this implementation, S244 may function to locate an account or details of the verification event including a stored verification challenge value and transmit the verification challenge value to the subscriber to the threat service. In such embodiments, the subscriber to the threat service may function to perform a comparison and/or validation of the response of the target user to the verification communication message (i.e., the verification challenge).

In another implementation, a response to the verification challenge communication may be provided (directly or indirectly through a messaging service) to the threat service. In such implementation, a request for a verification check from a subscriber that initiated the verification of a target user may include verification data that identifies one or more of an original request for verification, an account, user communication address (e.g., user email, user phone, etc.) and/or a user identifier that may function to enable the threat service to identify an active verification event or the like.

Additionally, or alternatively, in response to a request for verification check, S244 may function to compare a response to the verification challenge to a cryptographically stored copy of the verification challenge. That is, in one embodiment, if the verification challenge is a one-time password, S244 may function to compare the response to the verification challenge to the one-time password that was generated for the verification challenge and stored with the threat service. In another embodiment, if the verification challenge includes a prompt requesting a confirmation of an event or transaction, S244 may function to return whether the prompt confirmed (e.g., "Yes, it's me") or denied (e.g., No, it's not me) the event or transaction.

Thus, in one or more embodiments, S244 may function to return results (e.g., success or failure, etc.) of the verification challenge communication based on a request for verification check from a subscriber. In the circumstance that the verification may be a failure or includes an unsuccessful attempt at the verification challenge, S244 may additionally or alternatively detail in a verification results response to a request for a verification check the type of failure to the verification challenge, which may include, but may not be limited to, an expiry of the verification challenge or a failure to provide a verification response prior to an expiry of the verification challenge (i.e., no attempt, timeout, etc.), one or more unsuccessful responses (e.g., bad attempts, wrong challenge response(s), etc.) to the verification challenge, and the like.

2.45 Active Verification Control|Verification Limits

In one or more embodiments, the method 200 may additionally or alternatively include S245, which includes implementing one or more verification limits. In such embodiments, the one or more verification limits may function to limit a number and/or a manner in which a target user may attempt to respond to one or more verification challenges from the threat service.

In some embodiments, the one or more verification limits include limiting a number of new challenges that may be generated by the threat service for a target user during a period. That is, S245 may function to designate a maximum number of new verification challenges that a target user may request for authenticating or verifying for a given event and/or a target online activity.

In one implementation, S245 may function to implement a (virtual) token bucket (e.g., a leaky bucket) that includes or keeps a count of the verification tokens (e.g., verification challenges, and the like) towards a maximum number of codes that may be generated by the threat service for verification of a given event and/or target user during a period. In this implementation, the token bucket may include a predetermined or set number of tokens, where each token represents a new, distinct code or a new verification challenge that may be generated by the threat service. S245 may function to implement a counter that may be incremented based on a number of verification attempts to the maximum number of tokens or decremented based on a number of verification attempts from the maximum number of tokens to 0. Accordingly, if all code tokens are exhausted from the token bucket, S245 may function to impose a timeout, which includes a period in which no new code tokens may be used to generate new verification challenges to a target user. Accordingly, in some embodiments, even if a subscriber makes a request for a verification resend (i.e., requesting a new verification challenge to a target user), S245 may function to only send a new verification communication challenge to the target user only after the timeout period has expired and/or the token bucket has been renewed.

In one or more embodiments, the token bucket may additionally include or be associated with an expiry, such that if the expiry is not satisfied, new tokens cannot be added to the token bucket. Stated differently, if the expiry of the token bucket is satisfied, S245 may function to reset the token bucket and restore tokens to the token bucket so that new verification challenges may be generated for a target user.

In another implementation, the one or more verification limits may additionally or alternatively include limiting a rate of response to a verification challenge within a defined period. That is, for a given verification challenge sent to a target user, S245 may function to limit the number of attempts by a user or the like against the verification challenge. For instance, S245 may impose a rate limit of three (3) attempts against a given verification challenge and if a user has made three unsuccessful attempts against the given verification challenge, S245 may cause user attempts to verify against the given verification challenge that exceed the rate limit to fail (i.e., any response to the verification may not be considered or used in validating the automated verification challenge or the like). Accordingly, a new verification challenge or code may have to be generated for a target user before additional attempts may be made. Similar to a verification limit to the number of verification challenges, S245 may function to implement a second distinct token bucket having a maximum number of attempts per verification challenge.

In some embodiments, a state of a token bucket may be atomically updated with each issued verification challenge and/or attempts against a verification challenge.

2.5 Verification Disposal Backfill|Model Tuning

Optionally, or additionally, S250, which includes collecting verification disposals and updating one or more subscriber-specific machine learning threat scoring models, may function to collect verification disposals decisions from the subscriber relating to an action (e.g., a disposal of a transaction request by a user, etc.) by the subscriber to validate or deny (block) an event based on one or more of a threat score produced based on a processing of a verification request from the subscriber and an outcome of the request for verification of a target user.

In one or more embodiments, S250 may function to build a corpus of training data based on the collected verification decisions. In such embodiments, S250 may function to identify event data associated with each verification decision and augment with the event data with metadata, such as labels (e.g., validated, approved, blocked, canceled, reviewed, etc.), that indicate a decision of the subscriber against one or more actions or transactions of the event data.

In one or more embodiments, S250 may function to train and/or update one or more subscriber-specific machine learning models to improve the threat predictions thereof and correspondingly, improve automated workflow verification decisions (i.e., whether or not to trigger an automated verification of a target user or target online activity).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for implementing a machine learning-informed automated verification of online activity, the method comprising:

executing a request, via an application programming interface (API), for computing an activity disposal decision for a target online activity based on a machine learning-based threat score computed based on features of the target online activity;
wherein executing the request includes:
evaluating the machine learning-based threat score for the target online activity against one or more criteria of an automated disposal decisioning workflow;
computing the activity disposal decision based on the evaluation, wherein the activity disposal decision informs an action to allow or to disallow the target online activity;
executing an automated verification workflow based on the execution of the request including:
receiving the machine learning-based threat score as input into the automated verification workflow;
computing whether to perform an automated verification of the target online activity based on an evaluation of the machine learning-based threat score against one or more distinct verification decisioning criteria of the automated verification workflow;
if the evaluation of the of the machine learning-based threat score via the automated verification workflow satisfies one of the one or more distinct verification decisioning criteria, automatically executing the automated verification of the target online activity and exposing results of the automated verification for allowing or for disallowing the target online activity; and
implementing a verification limit that limits a number of verification challenges that can be generated by the threat mitigation service during a period for the automated verification of the target online activity.

2. The method according to claim 1, wherein
the one or more distinct verification decisioning criteria comprise one or more verification thresholds, each of the one or more verification thresholds comprising a distinct minimum machine learning threat score value that, when satisfied, automatically causes an execution of a verification route of the automated verification workflow.

3. The method according to claim 2, wherein:
each of the one or more verification thresholds is tethered to one of a plurality of distinct verification routes,
if the machine learning-based threat score satisfies a distinct one of the one or more verification thresholds, automatically executing a distinct one of the plurality of distinct verification routes that is tethered to the distinct one of the one or more verification thresholds that was satisfied.

4. The method according to claim 2, wherein
the automated verification workflow comprises a multi-stage synchronous process flow that includes:
(i) a first stage that evaluates the machine learning threat score for the target activity against the one or more verification thresholds;
(ii) a second stage that identifies verification route based on the evaluation;
(iii) a third stage that identifies verification parameters including communication channel and communication address;
(iv) a fourth stage that identifies verification messaging template of the subscriber;
(v) a fifth stage that constructs a verification message based on verification data and the verification messaging template;
(vi) a sixth stage that communicates the verification messaging to a target user associated with the target online activity;
(vii) an intermediate stage that resends the verification messaging to the target if requested by the subscriber or a timeout of the verification messaging has occurred; and
(viii) a seventh state that identifies a result of the verification messaging.

5. The method according to claim 1, further comprising:
implementing a threat scoring API that uses one or more threat scoring machine learning models to predict the machine learning-based threat score, wherein the threat scoring API asynchronously provides the machine learning-based threat score directly to each of the automated disposal decisioning workflow and the automated verification workflow.

6. The method according to claim 1, wherein:
the activity disposal decision of the automated decisioning workflow is subject to the results of the automated verification;
if the results of the automated verification comprises an unsuccessful verification of the target online activity, the activity disposal decision of the automated decisioning workflow is rendered unavailable to the subscriber.

7. The method according to claim 1, wherein:
the activity disposal decision of the automated decisioning workflow is subject to the results of the automated verification;
if the activity disposal decision informs the action to allow the target online activity and the results of the automated verification comprises an unsuccessful verification of the target online activity, altering the activity disposal decision to inform the action to disallow the target online activity.

8. The method according to claim 2, wherein
the automated verification workflow comprises a binary automated verification workflow having only one verification threshold for identifying whether the automated verification of the target online activity is required or not for the target online activity.

9. The method according to claim 1, wherein
automatically executing the automated verification of the target online activity includes:
generating a verification challenge value by the threat mitigation service;
storing the verification challenge value with a unique identifier for the multi-part request;
selecting a verification message template based on an account identifier for the subscriber;
composing a verification communication message based on an integration of the verification challenge value with the verification message template; and
transmitting the verification communication message via a selected communication channel to a user.

10. The method according to claim 9, further comprising:
implementing response verification including:
receiving, via the API of the threat mitigation service, a request for verification check, the request for verification comprising the unique identifier for the multi-part request;
identifying the verification challenge value based on the unique identifier; and
transmitting the verification challenge value to the subscriber for validating or not a response to the verification communication message.

11. The method according to claim, wherein
implementing the verification limit includes one or more of:

implementing a virtual token bucket that tracks via a counter a count of the number of verification challenges created during the period for the automated verification of the target online activity;

implementing a rate of verification limit that limits a number of responses by the target user to a given verification challenge; and imposing a timeout that sets a restricted period in which no additional verification challenges can be generated for the automated verification of the target online activity.

12. The method according to claim 1, further comprising:
implementing a verification limit that limits a predetermined rate of response within a period to the automated verification of the target online activity.

13. The method according to claim 12, wherein implementing the verification limit includes:
setting a maximum rate of response to the automated verification; and
if a rate of response to the automated verification exceeds the maximum rate of response, causing additional response to the automated verification beyond the verification limit to fail.

14. A method for implementing a machine learning-informed automated verification of online activity, the method comprising:
executing a request, via an application programming interface (API), for computing an activity disposal decision for a target online activity based on a machine learning-based threat score computed based on features of the target online activity;
wherein executing the request includes:
evaluating the machine learning-based threat score for the target online activity against one or more criteria of an automated disposal decisioning workflow;
computing the activity disposal decision based on the evaluation, wherein the activity disposal decision informs an action to allow or to disallow the target online activity;
executing an automated verification workflow based on the execution of the request including:
receiving the machine learning-based threat score as input into the automated verification workflow;
computing whether to perform an automated verification of the target online activity based on an evaluation of the machine learning-based threat score against one or more distinct verification decisioning criteria of the automated verification workflow;
if the evaluation of the of the machine learning-based threat score via the automated verification workflow satisfies one of the one or more distinct verification decisioning criteria, automatically executing the automated verification of the target online activity and exposing results of the automated verification for allowing or for disallowing the target online activity; and
implementing a verification limit that limits a predetermined rate of response within a period to the automated verification of the target online activity.

15. A method for implementing a machine learning-informed automated verification of online activity, the method comprising:
executing a request, via an application programming interface (API), for computing an activity disposal decision for a target online activity based on a machine learning-based threat score computed based on features of the target online activity;
wherein executing the request includes:
evaluating the machine learning-based threat score for the target online activity against one or more criteria of an automated disposal decisioning workflow;
computing the activity disposal decision based on the evaluation, wherein the activity disposal decision informs an action to allow or to disallow the target online activity;
executing an automated verification workflow based on the execution of the request including:
receiving the machine learning-based threat score as input into the automated verification workflow;
computing whether to perform an automated verification of the target online activity based on an evaluation of the machine learning-based threat score against one or more distinct verification decisioning criteria of the automated verification workflow, wherein the one or more distinct verification decisioning criteria comprise one or more verification thresholds, each of the one or more verification thresholds comprising a distinct minimum machine learning threat score value that, when satisfied, automatically causes an execution of a verification route of the automated verification workflow, and wherein the automated verification workflow comprises a binary automated verification workflow having only one verification threshold for identifying whether the automated verification of the target online activity is required or not for the target online activity; and
if the evaluation of the of the machine learning-based threat score via the automated verification workflow satisfies one of the one or more distinct verification decisioning criteria, automatically executing the automated verification of the target online activity and exposing results of the automated verification for allowing or for disallowing the target online activity.

* * * * *